United States Patent [19]

Naritomi

[11] Patent Number: 5,472,782
[45] Date of Patent: Dec. 5, 1995

[54] THERMOPLASTIC ELASTOMER COMPOSITION HAVING AN EXCELLENT FUSION BOND PROPERTY AND FORMED COMPOSITE PRODUCT MAKING USE OF THE COMPOSITION

[75] Inventor: Masanori Naritomi, Urayasu, Japan

[73] Assignee: Taisei Plas Co., Ltd., Tokyo, Japan

[21] Appl. No.: 96,451

[22] Filed: Jul. 12, 1993

[51] Int. Cl.$^6$ .......................... B32B 27/36; B32B 27/40; B32B 27/34

[52] U.S. Cl. .................. 428/412; 428/423.1; 428/424.2; 428/474.4; 428/476.3; 428/500; 428/517

[58] Field of Search ............................... 525/92, 93, 127; 428/412, 423.1, 424.2, 474.4, 476.3, 500, 517

[56] References Cited

U.S. PATENT DOCUMENTS 3,562,355  2/1971  Holden .................................. 260/859
5,002,625  3/1991  Naritomi et al. ...................... 156/245

Primary Examiner—Paul J. Thibodeau
Assistant Examiner—Mary Critharis
Attorney, Agent, or Firm—Wenderoth, Lind & Ponack

[57] ABSTRACT

Described is a thermoplastic elastomer composition, which has excellent fusion bond property and is useful for the production of a formed composite product. The thermoplastic elastomer composition comprises (i) 3–100 parts by weight of an addition-polymerized thermoplastic block elastomer composed of polystyrene-polybutadiene blocks or polystyrene-polyisoprene blocks and (ii) 100 parts by weight of a thermoplastic polyurethane block elastomer. A formed composite product is composed of a formed body of a rigid synthetic resin and the thermoplastic elastomer composition.

6 Claims, No Drawings

5,472,782

THERMOPLASTIC ELASTOMER COMPOSITION HAVING AN EXCELLENT FUSION BOND PROPERTY AND FORMED COMPOSITE PRODUCT MAKING USE OF THE COMPOSITION

BACKGROUND OF THE INVENTION

1. Field of the Invention

The present invention relates to a thermoplastic elastomer composition having an excellent fusion bond property and also to a formed composite product making use of the composition.

More specifically, the present invention pertains to a thermoplastic elastomer composition which is indispensable for the production of a formed composite product composed of two pieces of formed bodies fusion-bonded to each other, one being made of a synthetic resin such as an engineering plastic having excellent mechanical strength and the other being made of the thermoplastic elastomer composition having excellent fusion bond property to the formed one. The present invention is also concerned with a formed composite product produced using the thermoplastic elastomer composition.

2. Description of the Related Art

Engineering plastics having excellent mechanical strength are employed in machine parts and structural parts, which are both used under load. As examples of such engineering thermoplastics, ABS resins, polyamides, polyacetals, polycarbonates, modified polyphenylene oxides, polybutylene terephthalate, polysulfones and wholly aromatic polyesters are known.

On the other hand, molded or otherwise formed (hereinafter collectively referred to a "formed" for the sake of brevity) products of thermoplastic elastomers (TPEs) are produced particularly by high-productivity injection molding and are also used for a variety of applications.

As is well known, a thermoplastic elastomer (TPE) is a material which exhibits properties as vulcanized rubber at room temperature but can be plasticized at high temperatures and formed by plastic processing machines. Its molecule contains both flexible units (soft segments) having rubber elasticity and molecule-restraining units (hard segments) for the prevention of plastic deformation. Examples of such thermoplastic elastomers (TPEs) known to date include styrene-butadiene elastomers, polyolefin elastomers, polyurethane elastomers, vinyl chloride elastomers and acrylic acid ester elastomers.

Injection molding described above permits production of molded articles even of complex shapes and is suited for mass production. It is also applied to the engineering plastics described above, whereby various kinds of machine and structural parts are manufactured efficiently.

There have recently been a strong demand for further improvements in the performance and function of parts and members made of synthetic resins (plastics). Under these circumstances, there is a move toward combining synthetic resins such as the above engineering plastics with thermoplastic elastomers in attempts to form composite products. For this purpose, it is most effective to fusion-bond these two materials together into a composite product by using injection molding which is a molding process common to them.

In general, however, thermoplastic elastomers (TPE) having excellent rubber elasticity have inferior fusion bond property to thermoplastic resins such as engineering plastics and therefore a firm bond cannot be obtained therebetween.

For this reason, when a thermoplastic resin, such as an engineering plastic, and a thermoplastic elastomer (TPE) are to be combined together to produce a formed composite product of high added value such as a composite part and composite member, it is inevitable under the current circumstances to adopt an extremely unproductive bonding process, for example to form complementary concave-convex portions in joint areas of members of the two different materials and then to join them together mechanically, or to apply an adhesive to the joint areas of the members of the two different materials and then to bond them together.

As has been described above, the conventional techniques of forming a composite product from a thermoplastic resin such as an engineering plastic and a thermoplastic elastomer (TPE) are accompanied by many drawbacks such as low efficiency and poor strength and sealing the joint areas.

More specifically, the method in which the two members of the different materials are mechanically joined at the engagement portions, such as complementary concave-convex inter-fitting, has the problems that it requires dies of more complex structures and, depending upon the structure, more production steps. Depending on the final shape of a formed composite product, it may be impossible to attain a strong composite structure. Furthermore, in the case of a formed composite product which is required to be waterproof, for example, water goggles in each of which a glass portion is made of a rigid engineering plastic material and a frame portion that comes into contact with a user's face is made of a soft, high-elasticity thermoplastic elastomer (TPE), no satisfactory water-proofness can be attained by mechanical engagement.

The method which uses an adhesive requires additional steps including application of the adhesive, and is accompanied by the problem that the bonding strength is low because of deterioration of the adhesive or the like.

SUMMARY OF THE INVENTION

With the foregoing problems of the related art in view, the present inventors have completed the present invention.

A first object of this invention is to provide a thermoplastic elastomer composition which has an excellent fusion bond property and is indispensable for the production of a formed composite product having a structure in which a formed member made of a synthetic resin such as an engineering plastic and another formed member made of a thermoplastic elastomer (TPE) having excellent rubber elasticity are firmly bonded together.

A second object of this invention is to provide a formed composite product composed of a formed body of a rigid synthetic resin and a thermoplastic elastomer composition having excellent bond property, and more specifically to provide, by strongly bonding together a formed member of a rigid synthetic resin material having excellent mechanical strength and a soft thermoplastic elastomer composition having excellent fusion bond properties, a novel function part or high value-added part, for example, a product (member) required to have high strength and waterproofness, such as water goggles; a product with a handle portion softened with a thermoplastic elastomer composition, such as a plastic handset of a telephone set or a handle (grip); a product with a thermoplastic elastomer integrally combined to an edge portion of the product to facilitate its attachment, such as a plastic headlight cover for an automobile; a packing such as an air shielding; a valve part, a power transmitting part such as a flexible coupling and a gear; and an I/O control button for a control device.

In one aspect of the present invention, there is thus provided a thermoplastic elastomer composition having excellent fusion bond property and adapted to be fusion-bonded to a formed body of a rigid synthetic resin to provide a formed composite product, comprising:

(i) 3–100 parts by weight of an addition-polymerized thermoplastic block elastomer composed of polystyrene blocks and diene blocks selected from the group consisting of polybutadiene blocks and polyisoprene blocks; and (ii) 100 parts by weight of a thermoplastic polyurethane block elastomer.

In another aspect, there is also provided a formed composite product comprising a formed body of a rigid synthetic resin and a thermoplastic elastomer composition having excellent fusion bond property and fusion-bonded on the formed body, wherein the thermoplastic elastomer composition comprises:

(i) 3–100 parts by weight of an addition-polymerized thermoplastic block elastomer composed of polystyrene blocks and diene blocks selected from the group consisting of polybutadiene blocks and polyisoprene blocks; and (ii) 100 parts by weight of a thermoplastic polyurethane block elastomer.

In the present invention, as have already been described, the component (i) is called "an addition-polymerized thermoplastic block elastomer" whereas the component (ii) is, for distinguishing the latter from the former, called "a condensation-polymerized type thermoplastic block elastomer". Needless to say, the component (ii) can also be called "a segmented thermoplastic elastomer".

The thermoplastic elastomer composition which can be obtained according to the present invention and has excellent fusion bond property is extremely useful for the production of a formed composite product comprising a formed body of a thermoplastic synthetic resin or engineering plastic and another formed body of the thermoplastic elastomer composition.

The formed composite product can be produced efficiently and economically by fusion bonding, for example, injection molding the thermoplastic elastomer composition onto the formed body of the synthetic resin.

In particular, the thermoplastic elastomer composition of the present invention, which has excellent rubber elasticity and is soft, can be fusion-bonded firmly to a high-hardness engineering plastic such as a polycarbonate by simple and easy injection molding. In addition, the thermoplastic elastomer makes it possible to form a portion excellent in surface properties. Thus, thanks to the present invention, a formed composite product having new properties and new functions can be provided efficiently.

DETAILED DESCRIPTION OF THE INVENTION AND PREFERRED EMBODIMENTS

The present invention has been completed as a result of a pursuit of a method for the efficient combination of a formed body of a high-hardness (JIS Shore A hardness) synthetic resin, such as a polycarbonate, with a thermoplastic elastomer (TPE) which has excellent rubber elasticity, is soft and can afford a formed body lower in hardness and higher softness than the formed body of the synthetic resin.

An attempt to simply fusion-bond a thermoplastic elastomer of high elasticity to a pre-formed body of a synthetic resin having high hardness, for example, by injection molding can provide only extremely insufficient bonding strength.

In view of the above defect, the present inventors have already proposed compositions composed of a thermoplastic elastomer (TPE) and a specific polyether block amide and those made of a thermoplastic elastomer (TPE) and a thermoplastic polyester elastomer, respectively in U.S. Pat. Nos. 5,002,625 and 5,149,589.

These compositions may be considered satisfactory from the fact that they can be fusion-bonded to a formed body of a high-hardness synthetic resin such as a polycarbonate to thereby form a formed composite product.

Some of products which make use of the formed composite products of the type described above, however, require excellent surface properties such as abrasion resistance, smoothness and flexibility particularly at their thermoplastic elastomer (TPE) portions. From the standpoint of this requirement, the above compositions are unsatisfactory.

The most significant feature of the present invention resides in that, in order to firmly fusion-bond a formed body of a high-hardness synthetic resin with another formed body of a high-elasticity and soft thermoplastic elastomer (TPE) into a formed composite product having excellent surface properties, a composition of a specific addition-polymerized thermoplastic block elastomer and a condensation-polymerized thermoplastic polyurethane block elastomer is used as the formed body of the thermoplastic elastomer.

In the present invention, the addition-polymerized thermoplastic block elastomer, one of the two components constituting the thermoplastic elastomer composition, is a block copolymer composed of polystyrene blocks (each of which may hereinafter be abbreviated as "S") and a hydrogenated or unhydrogenated polybutadienes blocks or polyisoprene blocks (each of which may hereinafter be abbreviated as "B" or "I", respectively).

In the present invention, typical examples of the component (i), that is, the addition-polymerized thermoplastic block elastomer include those containing polybutadiene blocks as diene blocks. Block elastomers of this type include a di-block elastomer represented by (S-B) as well as tri-block and higher-block elastomers represented by S-(B-S)n wherein n stands for 1–5. The addition-polymerized thermoplastic block elastomer per se is known and, for example, is disclosed as a hydrogenated substance in Japanese Patent Application Laid-Open No. 174550/1990 in which the elastomer is used for improved impact resistance and Japanese Patent Application Laid-Open No. 260645/1985 in which the elastomer is used as one component for obtaining an injection-molding polyethylene terephthalate composition of small heat-shrinkage. As an unhydrogenated substance, it is disclosed in Japanese Patent Application Laid-Open No. 178187/1988 in which the elastomer is used as one component of an adhesive composition.

As the block elastomer useful in the practice of the present invention, which is composed of polystyrene blocks and polybutadiene blocks, those having a number-average overall molecular weight of from 5,000 to 500,000 and containing 5–70 wt. % of S block units and the remainder of B blocks in which at least 70% of double bonds have been hydrogenated are preferred. In addition, those composed of S block units having a weight-average molecular weight of 5,000–125,000 and B block units having a weight-average molecular weight of 15,000–250,000 can also be exemplified. Hydrogenated block elastomers of this type usable in this invention per se are known or can be manufactured easily in a manner commonly employed by those skilled in the art, although they are also disclosed in the above publications.

Specific examples of the addition-polymerized thermoplastic block elastomer include, as hydrogenated elastomers, "RABALON" (trade mark; product of Mitsubishi Petrochemical Co., Ltd.), "TAFTECK" (trade mark; product of Asahi Chemical Industry Co., Ltd.) and "KRATON G" (trade name; product of Shell Kagaku K.K.) and as unhydrogenated elastomers, "ELASTOMER AR" (trade name; product of Aron Chemical), "KURATON KALIFLEX TR" (trade name; product of Shell Kagaku K.K.) and "JSR TR" (trade name; product of Japan Synthetic Rubber Co., Ltd.).

In the present invention, other typical examples of the component (i), that is, the addition-polymerized thermoplastic block elastomer include those containing polyisoprene blocks as diene blocks. The block elastomers of this type are each formed of two blocks represented by (S-I) or three or more blocks represented by S-(I-B)n wherein n stands for 1–5. The addition-polymerized thermoplastic block elastomers of this type are known per se and are disclosed, as hydrogenated elastomers, for example, in Japanese Patent Application Laid-Open No. 13380/1989 in which an elastomer of the triblock type is used as a component of an adhesive composition and also in Japanese Patent Application Laid-Open Nos. 174550/1990 and 260645/1985 referred to above. Unhydrogenated elastomers, on the other hand, are disclosed in Japanese Patent Application Laid-Open No. 178187/1988 referred to above.

Preferably usable examples of the addition-polymerized thermoplastic block elastomer in the present invention are those having a number-average overall molecular weight within a range of 5,000–500,000 and containing 5–70 wt. % of S block units and the remainder of I blocks in which at least 70% of double bonds have been hydrogenated. In addition, those composed of S block units having a weight-average molecular weight of 15,000–250,000 can also be exemplified. Hydrogenated block elastomers of this type usable in this invention per se are known or can be manufactured easily in a manner commonly employed by those skilled in the art, although they are disclosed in the above publications.

Specific examples of the above-described addition-polymerized thermoplastic block elastomer in the present invention include "SEPTON" (trade mark, product of Kuraray Co., Ltd.). It is available in two types, one being of the saturated diblock type ("SEP") and the other of the triblock type ("SEPS"). They are both usable.

The condensation-polymerized thermoplastic polyurethane block elastomer, the other component (ii) of the thermoplastic elastomer composition of the present invention, will next be described in detail.

The thermoplastic polyurethane elastomer employed in the present invention may comprise a hard segment composed of a diisocyanate and a short-chain glycol (e.g., ethylene glycol, propylene glycol, 1,4-butanediol, bisphenol A) and a soft segment composed of a diisocyanate and a long-chain polyol. Examples of the long-chain polyol include polyethers such as polyalkylene glycol and polyesters such as polyalkylene adipate, polycaprolactone and polycarbonates. Thermoplastic polyurethane elastomers of this type are represented by the following formula:

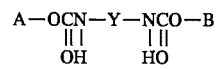

wherein A represents a hard segment composed of a diisocyanate and a short-chain glycol, B represents a soft segment composed of a diisocyanate and a long-chain polyol and Y represents a residuum of a diisocyanate compound as an urethane bond which connects the segment A and the segment B together. Illustrative of the diisocyanate compound include those commonly known and employed, such as phenylene diisocyanate, tolylene diisocyanate, xylene diisocyanate, 4.4'-diphenylmethane diisocyanate and hexamethylene diisocyanate.

There are commercially available thermoplastic polyurethane elastomers, for example, "MIRACTRAN" (trade mark, product of Nippon Miractran Co., Ltd.), "DEMOSPUN" (trade mark, product of Sumitomo Bayer Urethane Co., Ltd.) and "LEZAMINE" (trade mark, product of Dainichiseika Color & Chemicals Mfg. Co., Ltd.)

It is not clear why the combined use of an addition-polymerized thermoplastic block elastomer, that is, the component (i) (an elastomer formed of polystyrene blocks and hydrogenated or unhydrogenated polybutadiene blocks or polyisoprene blocks) with a thermoplastic polyurethane block elastomer, i.e., the component (ii) can form strong joint through fusion bonding between a formed body of a high-hardness synthetic resin and a formed body of a high-elasticity and soft thermoplastic elastomer. It is, however, believed that the strong joint results from effective interaction of the hard segment, soft segment and functional groups such as —OH, —CNO and —NHCOO— of the addition-polymerized thermoplastic block elastomer and the thermoplastic polyurethane block elastomer on the surface of the formed body of the synthetic resin at the fusion-bonded area between the formed bodies of the different materials.

The properties of the above-described thermoplastic polyurethane block elastomer vary with the ratio of the hard segment to the soft segment or the kinds of components constituting each segment. In general, it has excellent bending strength, oil resistance, abrasion resistance and heat resistance. The elastomer, however, has higher hardness and therefore inferior in flexibility compared with conventional elastomers so that it is desirable to eliminate these defects by blending it with the addition-polymerized thermoplastic block elastomer described above. In general, 3–100 parts by weight of an addition-polymerized thermoplastic block elastomer can be blended per 100 parts by weight of the thermoplastic polyurethane block elastomer. A thermoplastic elastomer composition having excellent fusion bond property can be prepared at such a blending ratio. Needless to say, however, it is desirable to use such a block elastomer composition after blending and dispersing both the components into a uniform sea-isle relationship.

In the present invention, the component (i), an addition-polymerized thermoplastic block elastomer and the component (ii), a thermoplastic polyurethane block elastomer, are essential components. Any other elastomer components and/ or additive commonly employed in the present field of art, such as fillers, can also be employed obviously.

It is possible to use any thermoplastic elastomer as a further, optional thermoplastic elastomer insofar as it provides a formed body having higher elasticity and relatively lower hardness than the below-described synthetic resin as the counterpart of the composite product. Examples of such thermoplastic elastomers include olefin elastomers such as EPR, diene elastomers such as SBR, and high-elasticity plastic polyvinyl chloride to which a plasticizer has been added. In order to obtain a formed composite product of high added value, it is particularly preferable to employ a thermoplastic elastomer composition having a hardness (JIS Shore A hardness) of from 70 or lower, especially 70–35.

The thermoplastic elastomer composition comprising (i) the addition-polymerized thermoplastic block elastomer and (ii) the thermoplastic polyurethane block elastomer and having excellent fusion bond property is firmly fusion-bonded to a formed body of a synthetic resin having higher hardness than the above composition, whereby a useful formed composite product having excellent surface properties can be obtained.

Examples of the formed body of a synthetic resin, which is to be combined, include thermoplastic engineering plastics, for example, polycarbonate resins, polyamide resins such as nylon 6, nylon 11 and nylon 12, ABS resin and polymethacrylic resins and thermoplastic synthetic resins such as polyolefin resins. In order to obtain a formed composite product of high added value, it is desirable to select one having a hardness of 70 or higher from the above-mentioned synthetic resins.

Any desired process can be employed for the production of the formed composite product in which the formed body of the thermoplastic elastomer composition of the present invention is firmly fusion-bonded to the formed body of a high-hardness synthetic resin. For example, the thermoplastic elastomer composition of the present invention having excellent rubber elasticity can be fusion-bonded to a formed body which has been obtained in advance from a synthetic resin of high hardness. Alternatively, the synthetic resin having high hardness is fusion-bonded to a formed body which has been obtained in advance from the thermoplastic elastomer composition of the present invention having excellent rubber elasticity, whereby the formed composite product can be obtained.

As a specific technical process to obtain the formed composite product by fusion-bonding the formed body of the high-hardness synthetic resin and the formed body of the thermoplastic elastomer composition having excellent fusion bond property, any desired one of commonly known or used processes can be employed. For example, it is possible to adopt any forming or molding process in which fusion bonding conditions are set, for example, injection molding, extrusion, blow molding, calendering, compression molding, transfer molding or the like. Among these, injection molding is certainly most desirable from the viewpoint of productivity.

Incidentally, the term "JIS Shore A hardness" as used herein means the hardness as measured by a type-A durometer in accordance with the testing method stipulated under K-7215 of the JIS (Japan Industrial Standard).

The present invention will be described below in further detail by the following Examples, in which all designations of "part" or "parts" mean part or parts by weight unless otherwise specifically indicated. It should be noted that the present invention is in no way restricted to these Examples and can be changed or modified without departing from the spirit of the invention.

EXAMPLE 1

A thermoplastic elastomer composition was prepared as follows:

Ten parts of a hydrogenated SBS block polymer ("RABALON T3427C" trade name; product of Mitsubishi Petrochemical Co., Ltd.) as an addition-polymerized thermoplastic block elastomer and 100 parts by weight of a thermoplastic polyurethane block elastomer ("MIRACTRAN E 568" trade name; product of Nippon Miractran Co., Ltd.) were uniformly blended to obtain a polymer blend in which the two components were dispersed in a sea-isle relationship. The JIS Shore A hardness of the polymer blend was 68.

An experiment was then conducted, in which the thermoplastic elastomer composition prepared as described above was fusion-bonded to a molded body of a polycarbonate ("Panlite L-1225", trade name; JIS Shore A hardness: 99; product of Teijin Chemicals, Ltd.) to obtain a molded composite product.

More specifically, a main body of water goggles was formed in advance from the polycarbonate by injection molding, and the above-described thermoplastic elastomer composition was fusion-bonded to the main body of the water goggles by injection molding means to form face-contacting portions of the water goggles (reference is had to Japanese Patent Publication No. 23577/1987 for the whole structure of the water goggles).

The following injection molding conditions were used: nozzle temperature, 235° C.; cylinder temperature, 180° C.; die bottom temperature, 140° C.; mold temperature, 50° C.; and injection pressure, 400 kg/cm$^2$.

The polycarbonate and the thermoplastic elastomer composition were strongly and completely fusion-bonded together at the joint areas thereof. The bonding strength was equal to the tensile strength of the molded body of the thermoplastic elastomer composition. In other words, the polycarbonate and the thermoplastic elastomer composition were completely fusion-bonded together. In addition, the molded body of the thermoplastic elastomer composition had excellent surface abrasion resistance (scratch test).

Under similar conditions, experiments were conducted on two polymer blends, one consisting of 100 parts of the thermoplastic polyurethane block elastomer and 30 parts of the hydrogenated SBS block copolymer and the other 100 parts of the thermoplastic polyurethane block elastomer and 50 parts of the hydrogenated SBS block copolymer. In each experiment, the blend was also completely fusion-bonded to a molded body of the polycarbonate, thereby providing excellent surface properties.

As modifications of Example 1, injection molding was conducted in a similar manner to Example 1 except that an ABS resin (acrylonitrile-butadiene-styrene resin; "DENKAABS GR-1000", trade name; product of Denki Kagaku Kogyo Kabushiki Kaisha) and a methacrylic resin ("ACRYLPET" trade name; product of Mitsubishi Rayon Co., Ltd.) were used, respectively, instead of the polycarbonate. As a result, the polymer blend was fusion-bonded to molded bodies of the ABS resin and the methacrylic resin, respectively, with satisfactorily high bonding strength therebetween.

EXAMPLE 2

For molding such a machine part as that illustrated in Japanese Patent Application Laid-Open No. 144737/1982, the thermoplastic elastomer composition prepared in Example 1 was applied. In place of the molded polycarbonate body in Example 1, a machine part molded beforehand with Nylon 11 (JIS Shore A hardness: 85) was placed in a mold. Under the same conditions as in Example 1, the thermoplastic elastomer composition was fusion-bonded to the machine part by injection molding. The machine part and the composition were completely fusion-bonded together at the joint areas thereof and, in addition, the resultant composite product had excellent surface properties.

In a similar manner to the above except that a machine part molded beforehand with nylon 12 was used instead of that molded with nylon 11, the machine part and the composition were completely fusion-bonded together at the joint areas thereof.

EXAMPLE 3

A thermoplastic elastomer composition was prepared as follows:

Ten parts of an unhydrogenated SBS block polymer ("ELASTOMER AR140" trade name; product of Aron Kasei Co., Ltd.) as an addition-polymerized thermoplastic block elastomer and 100 parts by weight of a thermoplastic polyurethane block elastomer ("DESMOPAN 300", trade name; product of Sumitomo Bayer Urethane Co., Ltd.) were uniformly blended to obtain a polymer blend in which the two components were dispersed in a sea-isle relationship. The JIS Shore A hardness of the polymer blend was 70.

An experiment was then conducted in a similar manner to Example 1, in which the thermoplastic elastomer composition prepared as described above was fusion-bonded to a molded body (water goggles) of the polycarbonate to obtain a molded composite product. The results were exactly the same as those of Example 1, that is, the polycarbonate and the thermoplastic elastomer composition were strongly fusion-bonded together at the joint areas thereof and the resultant composite product had excellent surface properties.

The procedures of the modifications of Example 1 and that of Example 2 were repeated using the thermoplastic elastomer composition obtained in this Example. Exactly the same results were obtained.

EXAMPLE 4

A thermoplastic elastomer composition was prepared as follows:

Ten parts of a hydrogenated SBS block polymer ("RABALON T3427C", trade name; product of Mitsubishi Petro-Chemical Co., Ltd.) as an addition-polymerized thermoplastic block elastomer and 100 parts by weight of a thermoplastic polyurethane block elastomer ("LEZAMINE P 4000", trade name; product of Dainichiseika Color & Chemicals Mfg. Co., Ltd.) were uniformly blended to obtain a polymer blend in which the two components were dispersed in a sea-isle relationship. The JIS Shore A hardness of the polymer blend was 56.

An experiment was then conducted in a similar manner to Example 1, in which the thermoplastic elastomer composition prepared as described above was fusion-bonded to a molded body (water goggles) of the polycarbonate to obtain a molded composite product. The results were exactly the same as those of Example 1, that is, the polycarbonate and the thermoplastic elastomer composition were strongly fusion-bonded together at the joint areas thereof and, the resultant composite product had excellent surface properties.

The procedures of the modifications of Example 1 and that of Example 2 were repeated using the thermoplastic elastomer composition obtained in this Example. Exactly the same results were obtained.

EXAMPLE 5

A thermoplastic elastomer composition was prepared as follows:

Ten parts of a hydrogenated SIS block polymer ("SEPTON 2005", trade name; product of Kuraray Co., Ltd.) as an addition-polymerized thermoplastic block elastomer and 100 parts by weight of a thermoplastic polyurethane block elastomer ("MIRACTRAN E 568", trade name; product of Nippon Miractran Co., Ltd.) were uniformly blended to obtain a polymer blend in which the two components were dispersed in a sea-isle relationship. The JIS Shore A hardness of the polymer blend was 60.

An experiment was conducted in a similar manner to Example 1, in which the thermoplastic elastomer composition prepared as described above was fusion-bonded to a molded body (water goggles) of the polycarbonate to obtain a molded composite product. The results were exactly the same as those of Example 1, that is, the polycarbonate and the thermoplastic elastomer composition were strongly fusion-bonded together at the joint areas thereof and, the resultant composite product had excellent surface properties.

The procedures of the modifications of Example 1 and that of Example 2 were repeated using the thermoplastic elastomer composition obtained in this Example. Exactly the same results were obtained.

I claim:

1. A formed composite product comprising a formed body of a rigid synthetic resin and a thermoplastic elastomer composition having excellent fusion bond properties and fusion-bonded on the formed body, wherein the thermoplastic elastomer composition consists essentially of
   (i) 3–100 parts by weight of an addition-polymerized thermoplastic block elastomer composed of polystyrene blocks and diene blocks selected from the group consisting of polybutadiene blocks and polyisoprene blocks; and
   (ii) 100 parts by weight of a thermoplastic polyurethane block elastomer, wherein the thermoplastic polyurethane block elastomer has a hard segment prepared from a diisocyanate and a short-chain glycol and a soft segment prepared from a diisocyanate and a long-chain polyol.

2. A formed composite product of claim 1, wherein the diene blocks are hydrogenated or unhydrogenated.

3. A formed composite product of claim 1, wherein the long-chain polyol is polyetherpolyol or polyesterpolyol type.

4. A formed composite product of claim 1, wherein the formed body of the rigid synthetic resin has a JIS Shore A hardness of at least 70.

5. A formed composite product of claim 1, wherein the thermoplastic elastomer composition has a JIS Shore A hardness of 70 or smaller.

6. A formed composite product of claim 1, wherein the rigid synthetic resin is selected from the group consisting of polycarbonate resins, polyamide resins, ABS resins, polymethacrylic acid resins and polyolefin resins.

* * * * *